(12) United States Patent
Mizhen et al.

(10) Patent No.: US 10,114,973 B2
(45) Date of Patent: Oct. 30, 2018

(54) PROTECTING USER PRIVACY FROM INTRUSIVE MOBILE APPLICATIONS

(71) Applicant: Google LLC, Mountain View, CA (US)

(72) Inventors: Boris Mizhen, Brooklyn, NY (US); Lev Epshteyn, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/284,722

(22) Filed: May 22, 2014

(65) Prior Publication Data

US 2015/0339492 A1 Nov. 26, 2015

(51) Int. Cl.
*G06F 21/62* (2013.01)
*H04W 4/50* (2018.01)
*H04W 4/00* (2018.01)

(52) U.S. Cl.
CPC .......... *G06F 21/6245* (2013.01); *G06F 21/62* (2013.01); *G06F 21/6281* (2013.01); *H04W 4/001* (2013.01); *H04W 4/50* (2018.02); *G06F 2221/2127* (2013.01)

(58) Field of Classification Search
CPC .............................. G06F 21/62; G06F 21/6281
USPC .......................................................... 726/26
See application file for complete search history.

(56) References Cited

U.S. PATENT DOCUMENTS

| 8,595,489 | B1 | 11/2013 | Faaborg et al. | |
|---|---|---|---|---|
| 2005/0198645 | A1* | 9/2005 | Marr | G06F 21/606 719/310 |
| 2011/0246766 | A1* | 10/2011 | Orsini | G06F 11/1076 713/160 |
| 2012/0072397 | A1* | 3/2012 | Esaka | G06F 11/1464 707/652 |

(Continued)

FOREIGN PATENT DOCUMENTS

| WO | 2013101215 A1 | 7/2013 | |
|---|---|---|---|
| WO | 2013137616 | 9/2013 | |
| WO | WO-2014019364 A1 * | 2/2014 | ............ H04W 12/02 |

OTHER PUBLICATIONS

CloudFence: Enabling Users to Audit the Use of their Cloud-Resident Data; V. Pappas et al; Science Technical Reports, Columbia U. 2012; 14 pages.*

(Continued)

*Primary Examiner* — David J Pearson
(74) *Attorney, Agent, or Firm* — McDonnell Boehnen Hulbert & Berghoff LLP

(57) ABSTRACT

Systems and techniques are provided for protecting user privacy from intrusive mobile applications. A capability request may be received from an application. The capability request may be a request for access to data associated with a capability. A selection may be received to provide the application with stub data upon receiving a request from the application to access the data associated with the capability. The stub data may be generated to be provided to the application when the application requests the data associated with the capability. The stub data may be stored. A request may be received from the application for the data associated with the capability. It may be determined that the application is to be provided with the stub data when the application requests access to the data associated with the capability. The stub data may be retrieved. The stub data may be provided to the application.

29 Claims, 5 Drawing Sheets

(56) References Cited

U.S. PATENT DOCUMENTS

| | | |
|---|---|---|
| 2012/0291102 A1 | 11/2012 | Cohen et al. |
| 2012/0311697 A1 | 12/2012 | Swingler et al. |
| 2013/0055378 A1 | 2/2013 | Chang et al. |
| 2013/0067531 A1 | 3/2013 | Morris et al. |
| 2013/0152154 A1* | 6/2013 | Xiao ................ G06F 21/00 726/1 |
| 2013/0227683 A1 | 8/2013 | Bettini et al. |

OTHER PUBLICATIONS

"ISR of PCT/US2015/031916", International Search Report and Written Opinion issued in PCT/US2015/031916 on Jul. 29, 2015, 15.
International Preliminary Report on Patentability dated Nov. 22, 2016 as received in Application No. PCT/US2015/031916.
Beresford, R. A., et al., "MockDroid: trading privacy for application functionality on smartphones," Proceedings of the 12th Workshop on Mobile Computing Systems and Application; pp. 49-54 (2011).

\* cited by examiner

FIG. 4a

| Capabilities Manager |
|---|
| Application A |
| Application B |
| Application C |
| |

| Capabilities Manager |
|---|
| Application B |
| Phone Number |
| Contacts |
| Current Location |
| Location History |

| Capabilities Manager | | |
|---|---|---|
| Application B | | |
| Current Location | | |
| Actual Location | ☐ | |
| Stub Location | ☒ | |
| | Baltimore, MD | |

431, 432, 433 → 430

PROTECTING USER PRIVACY FROM INTRUSIVE MOBILE APPLICATIONS

BACKGROUND

Applications installed on computing devices, including mobile computing devices such as tablets and smartphones, may specify capabilities the application needs in order to function properly. For example, an application installed on a smartphone may request access to the phone number of the smartphone, current location data for the smartphone, and the list of contacts stored on the smartphone or in a user's account that is logged in to on the smartphone.

An application may define a list of capabilities the application requires in a file called a manifest. When the application is installed on a computing device, the application may be given all the capabilities that are specified in the manifest by default. Users may not be able to limit which capabilities an application is given to only a subset of the capabilities requested by the application. A user who does not wish to grant the application certain capabilities, for example, the capability to access the computing device's current location, may have no choice but to not install the application. In order to install the application, the user may be required to grant the application all of the requested capabilities. Additionally, applications may crash, refuse to provide other services or otherwise ungracefully handle situations when the application has not been granted the capabilities the application expects to have. A user's desire to limit the capabilities of installed applications may limit the applications that the user can install and use on their computing device. This may make it difficult for a user to run the applications they would like while still protecting data on their computing device or in their user account from being accessed by the applications.

BRIEF SUMMARY

According to an embodiment of the disclosed subject matter, a capability request may be received from an application. The capability request may be a request for access to data associated with a capability. A selection may be received to provide the application with stub data upon receiving a request from the application to access the data associated with the capability. The stub data may be generated to be provided to the application when the application requests the data associated with the capability. The stub data may be stored.

A request may be received from the application for the data associated with the capability. It may be determined that the application is to be provided with the stub data when the application requests access to the data associated with the capability. The stub data may be retrieved. The stub data may be provided to the application.

The data associated with capability may include data associated with a computing device. The data associated with the capability may include data associated with a user account logged-in to a computing device. The data associated with the capability may include a phone number of a computing device, a contacts lists, a current location of the computing device, a location history of the computing device, sound data from a microphone of the computing device, image data from the camera of the computing device, accelerometer data from an accelerometer of the computing device, or sensor data from a sensor of the computing device.

Receiving the selection may include using a default selection or receiving the selection from a user. Storing the stub data may include storing the stub data in an entry for application capabilities for the application. Generating the stub data may include randomly generating the stub data or receiving the stub data as input from a user. The application may be unaware that the stub data is not the actual data. The stub data may be changed to prevent the application from detecting that the application is receiving stub data. A selection may be received to change the stub data for the application. Changed stub data may be received. The changed stub data may be stored in place of the stub data. A selection may be received to stop providing the application with the stub data when the application requests access to the data associated with the capability. The stub data may be removed. Upon receiving a request for the data associated with the capability from the application, actual data associated with the capability may be provided to the application instead of the stub data.

According to an embodiment of the disclosed subject matter, a means for receiving a capability request from an application, where the capability request may be a request for access to data associated with a capability, a means for receiving a selection to provide the application with stub data upon receiving a request from the application to access the data associated with the capability, a means for generating the stub data to be provided to the application when the application requests the data associated with the capability, a means for storing the stub data, a means for receiving a request from the application for the data associated with the capability, a means for determining that the application is to be provided with the stub data when the application requests access to the data associated with the capability, a means for retrieving the stub data, a means for providing the stub data to the application, a means for using a default selection, a means for receiving the selection from a user, a means for randomly generating the stub data, a means for receiving the stub data as input from a user, a means for changing the stub data to prevent the application from detecting that the application is receiving stub data, a means for receiving a selection to change the stub data for the application, a means for receiving changed stub data, a means for storing the changed stub data in place of the stub data, a means for receiving a selection to stop providing the application with the stub data when the application requests access to the data associated with the capability, a means for removing the stub data, and a means for upon receiving a request for the data associated with the capability from the application, providing actual data associated with the capability to the application instead of the stub data, are included.

A means for receiving a request for data from an application, where the requested data is associated with a capability, a means for determining that the application has not been allowed the associated capability, a means for preventing the application from accessing the requested data associated with the capability, and a means for providing the application with stub data are also included.

Systems and techniques disclosed herein may allow for protection of user privacy from intrusive mobile applications. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIGS. 4a, 4b and 4c show an example of a capabilities manager displayed on a computing device according to an implementation of the disclosed subject matter.

DETAILED DESCRIPTION

Figure 1:
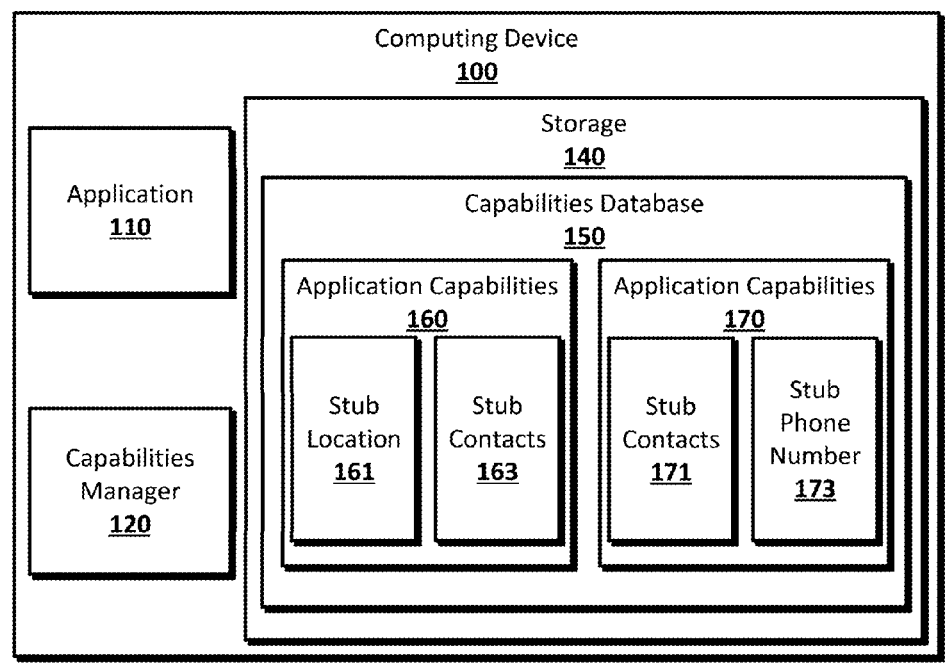
FIG. 1 shows an example system suitable for protecting user privacy from intrusive mobile applications according to an implementation of the disclosed subject matter.

A capabilities manager may be a component of an operating system, such as mobile operating system, that may handle and manage requests from applications for the capability to access data and requests for the data itself, using a capabilities database. When an application is installed on a computing device, such as smartphone or tablet, the application may request certain capabilities, or permissions, to access data on and about the computing device, including data from a user account logged in to the computing device. For example, during installation, the application may request the capability to access the computing device's current location, location history, contact list, phone number, camera data, microphone data, or data from other hardware components of the computing device. The capabilities manager may handle the capability requests from the application being installed on an individual basis, presenting the user with the option to allow or stub out each requested capability separately. The user may make a selection for each capability request, or the capabilities manager may apply default selections, either pre-set or set by the user, to one or more of the capability requests.

When a user chooses to stub out one of the application's capability requests, the capabilities manager may store data in the capabilities database indicating that the application should be provided with stub data instead of actual data when the application requests the data for the stubbed out capability. For example, the user may choose to stub out an application's capability request for access to the computing device's current location. The capabilities manager may store a stub location, which may be a location that is not the actual current location of the computing device, in an entry in the capabilities database for the application. The stub data stored in the capabilities database may be default data or data entered by the user. For example, the stub location may be a location entered by the user, or may be a location selected by the capabilities manager. The stub data may also be randomized or semi-randomized, for example, to prevent an application from determining that the data is stub data and not the actual data requested by the application. For example, the stub data for the current location of the computing device may be randomly changed to different locations around the same city, instead of always being the same location. For example, stub data for current location provided to a social networking application may always provide a slightly different location within the same city, mimicking movement of the computing device around the city, although the stub locations may not correspond to the actual locations of the computing device. Stub data for contacts may be randomized with fake contacts, which may be provided to applications that have had capability requests for contacts stored on the computing device stubbed out. Stub data for other hardware on the computing device may be similarly generated to be provided in the place of actual data. For example, images from the camera, sounds from the microphone, data from an accelerometer, and data from any other sensor or other hardware on the computing device, may all be generated to appear to an application to be actual data, without being the actual data from the hardware. The actual data may be data that provides an accurate response to a request for data, for example, providing the actual location of smartphone according to a GPS chip in the smartphone.

The capabilities manager may handle requests for data from running applications based on the data stored in the capabilities database. When a running application requests data, the capabilities manager may check the capabilities database to determine if the application's request for the capability to access the data has been allowed. If the application's capability request was allowed, the capabilities manager may provide, or allow access to, the actual requested data. If the application's capability request was stubbed out, the capabilities manager may provide the stub data from the capabilities database to the application. For example, a running application may request the phone number of the computing device. The capabilities manager may receive the request and check the capabilities database to determine the status of the application's capability request for access to the computing device's phone number. If the capability request was allowed, either when the application was installed or later, the capabilities manager may provide the computing device's phone number to the application. If the capability request was stubbed out, the capabilities manager may provide a stub phone number, which may not be the computing device's phone number, from the capabilities database to the application. The capabilities manager may determine if a capability request by an application was allowed or stubbed out based on the absence or presence of stub data in the entry for the application in the capabilities database. The presence of stub data related to the capability request may indicate that the capability request was stubbed out. For example, if an entry for an application in the capabilities database includes a stub location, this may indicate to the capabilities manager that the application's capability request for access to the computing device's current location was stubbed out.

In some implementations, the capabilities database may store data indicating each selection made for each capability request made by an application. For example, the capabilities database may store an indication of each stubbed out capability request and each allowed capability request in the entry for the application. The capabilities manager may determine whether to provide actual data or stub data to an application by checking the data indicating the selection in the capabilities database. In some implementations, the capabilities database may store the stub data separately from the data indicating the stubbed out capabilities request, so only one instance of a particular item of stub data may be stored in the capabilities database and shared among the applications running on the computing device. For example, one stub location may be stored in the capabilities database and provided to any application which has had a capability request for access to the computing device's current location stubbed out.

An application which receives stub data may be unaware that the data is not the actual requested data. The capabilities manager may provide stub data to the application in the same manner as actual data, so that the application receives all requested data in the same manner and cannot distinguish between the stub data and actual data. The application may also be unaware that some of the application's capability requests were stubbed out during installation or later. The application may operate as if all capability requests were granted, allowing the application to be installed and to run properly while allowing the user to limit the capabilities, or permissions, granted to the application, preventing the application from accessing data on the computing device and in the user's accounts that the user wishes to keep private from the application.

The capabilities manager may also allow a user to manage capability requests and stub data, for example, allowing the user to edit the entries in the capabilities database. The user may be able to select an installed application and change the application's capabilities. For example, the user may allow the application access to actual data after the application's capability request was stubbed out during installation, or may stub out an application's capability request after the capability request was allowed during installation. For example, the user may have chosen to stub out a social networking application's request during installation to access the current location of the computing device. Later, the user may decide to grant the capability request, allowing the social networking application access to the current location of the computing device instead of providing the stub location. The user may use the capabilities manager to access the capabilities database and edit the entry for the social networking application, changing the capability request for the current location of the computing device from stubbed out to allowed. The user may also edit the stub data provided to applications, for example, changing the stub location or stub phone number applications receive from the capabilities manager.

The capabilities manager may be implemented in the operating system of the computing device in any suitable manner. For example, the capabilities manager may be spread across the Application Programming Interfaces (APIs) used by the operating system to control access to the data an application may request the capability to access. For example, a first API may control access to contact data and a second API may control access to the current location of the computing device. Both the first and the second APIs may be modified to include the functionality of the capabilities manager, so that an application that uses either API to access data will have the request handled by the capabilities manager. The capabilities manager may also be a separate program, API, or operating system component, which may receive or intercept any request for data from an application and may work in conjunction with the appropriate API to provide the application with actual data or stub data as determined by the capabilities database.

The capabilities database may be shared across computing devices that are logged in to the same user account. For example, the user may have an account in an umbrella ecosystem, which may include an application ecosystem which the user may use to download and install applications to multiple computing devices. The account may also include the user's data, for example, the user's contacts, emails, phone numbers associated with the user's computing devices, and the location of the user's computing devices. The user may install an application on a first computing device, and make selections regarding which capability requests to allow and which to stub out. The user's selections may be stored in the capabilities database of the first computing device. The capabilities database of the first computing device may be synced with the user's account in the umbrella ecosystem, and be made available to any other computing device to which the user logs in. If the user installs the same application on a second computing device on which the user has logged in, the user's selections regarding capability requests for the application on the first computing device may be applied to the second computing device. This may ensure that the data which a user wishes to remain private will remain private across multiple computing devices.

FIG. 1 shows an example system suitable for protecting user privacy from intrusive mobile applications according to an implementation of the disclosed subject matter. A computing device 100 may include an application 110, a capabilities manager 120, and storage 140. The computing device 100 may be any suitable device, such as, for example, a computer 20 as described in FIG. 7, for implementing the application 110, the capabilities manager 120, and the storage 140. The computing device 100 may be a single computing device, or may include multiple connected computing devices, and may be, for example, a mobile computing device, such as a tablet or smartphone, running a mobile operating system. The capabilities manager 120 may use the capabilities database 150 to store application capabilities 160 and 170, including stub data such as the stub location 161, stub contacts 163 and 171, and stub phone number 173. The storage 140 may store the capabilities database 150 in any suitable format.

The capabilities database 150 may store the application capabilities 160 and 170. The application capabilities 160 and 170 may be database entries including data relating to the capability requests made by applications installed on the computing device 100. For example, during the installation of the application 110 on the computing device 100, the application capabilities 160 may be added to the capabilities database 150 to store selections made regarding capability requests from the application 110. For example, the user may select to provide the application 110 with stub data for the current location of the computing device 100 and the user's contacts. The stub location 161 and the stub contacts 163 may be stored in the capabilities database 150 in the entry for the application capabilities 160. Allowed capability requests from the application 110 may also be stored in the capabilities database 150. The application capabilities 170 may be an entry in the capabilities database 150 storing data regarding the capability requests of a second application installed on the computing device 100, which the user may have selected to provide with stub contacts 171 and stub phone number 173.

In some implementations, the capabilities database 150 may store the application capabilities, for example, the application capabilities 160 and 170, without the stub data. The application capabilities 160 may include indications of which capability requests were allowed or stubbed out for the application 110, but not the stub data itself. The stub data may be stored separately within the capabilities database 150 so that, for example, each item of stub data may be accessed and provided to any application running on the computing device 100, instead of storing individual items of stub data for each application. For example, the stub location 161 may be provided not only to the application 110, but to a second application running on the computing device 100 as well.

Figure 2:
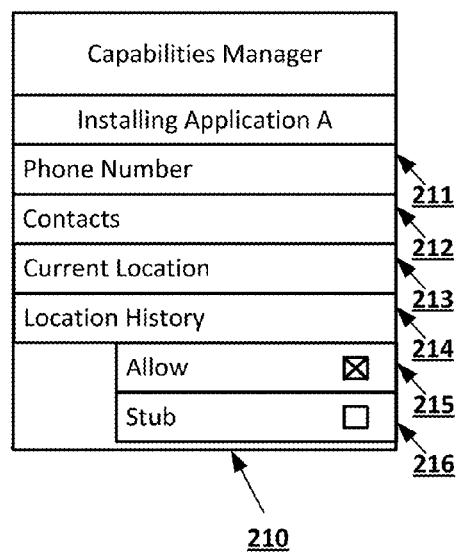
FIG. 2 shows an example of a capabilities manager displayed on a computing device according to an implementation of the disclosed subject matter.

FIG. 2 shows an example of a capabilities manager displayed on a computing device according to an implementation of the disclosed subject matter. During the installation of an application on the computing device 100, for example, the application 110, the capabilities manager 120 may present a list of capability requests from the application 110 on the display of the computing device 100. The installation display 210 may include all of the capability requests in the manifest of the application 110, such as, for example, access to the phone number of the computing device 100, the user's contacts, the current location of the computing device 100, and the location history of the computing device 100.

The user may select the capability requests from the installation display 210, for example, by selecting phone number request 211, contacts requests 212, current location request 213, or location history request 214. Selecting a capability request may prompt the user to select to allow the capability request, for example, using allow box 215, or stub out the request, using stub box 216. Selecting the allow box 215 for a capability request may allow the application 110 to access the actual data for the associated capability request, while selecting the stub box 216 may cause the application 110 to be provided with stub data for the associated capability request. For example, selecting the allow box 215 for the location history request 214 may allow the application 110 access to the actual location history of the computing device 100. Selections made by the user on the installation display 210 may be stored in the capabilities database 150, for example, in the application capabilities 160 for the application 110.

Each of the capability requests may either be allowed or stubbed out by default, and the user may use the installation display 210 to edit the default selections. The user may also be able to allow or stub out all of the capability requests from the installation display 210 by selecting a single interactive element, such as, for example, an "allow all" or "deny all" button.

Figure 3:
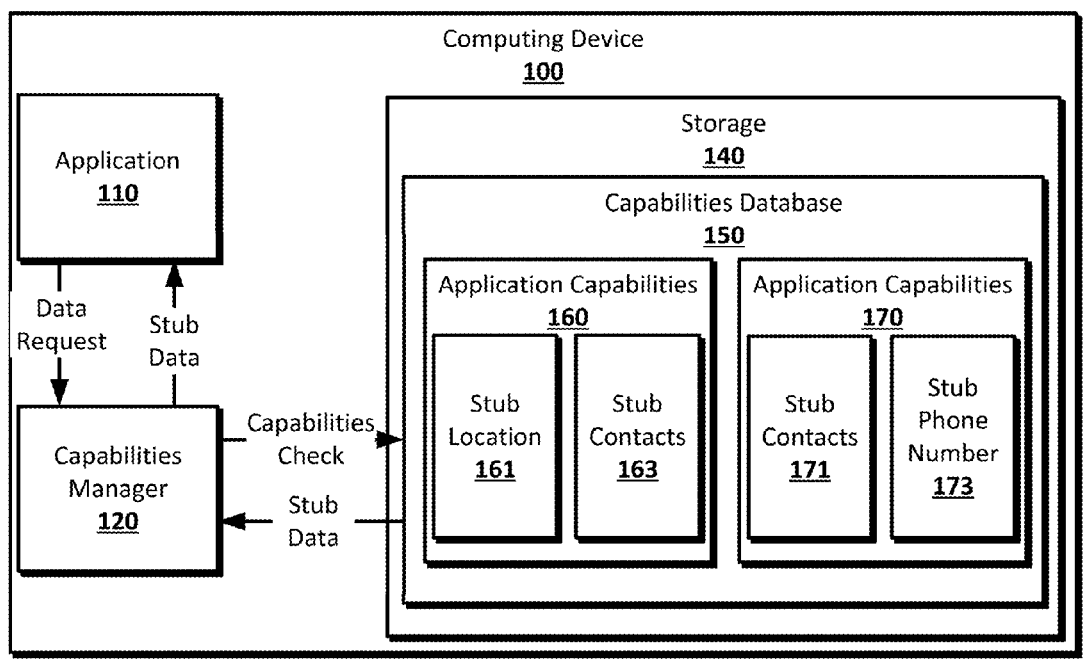
FIG. 3 shows an example arrangement for protecting user privacy from intrusive mobile applications according to an implementation of the disclosed subject matter.

FIG. 3 shows an example arrangement for protecting user privacy from intrusive mobile applications according to an implementation of the disclosed subject matter. The application 110 may be run on the computing device 100. While running, the application 110 may request data that was subject to a capability request, such as, for example, the current location of the computing device 100. The capabilities manager 120 may receive the data request from the application 110. For example, the capabilities manager 120 may be a component or API of the operating system to which all data requests are directed or which intercepts data requests directed to other components of the operating system such as other APIs. Alternatively, the capabilities manager 120 may be distributed among APIs in the operating system used to control access to data, such as, for example, the API for location data.

The capabilities manager 120 may use the capabilities database 150 to determine the appropriate handling of the data request from the application 110. The capabilities manager 120 may check the appropriate entry in the capabilities database 150 for the application 110, for example, the application capabilities 160. If the application capabilities 160 includes an indication that data request for the application 110 should be fulfilled with stub data, the capabilities manager 120 may return the stub data to the application 110. For example, the application capabilities 160 includes the stub location 161, indicating that the application 110 should be provided with stub data in response to a data request for the current location of the device 110. The capabilities manager 120 may return the stub location 161 to the application 110. If the application capabilities 160 includes an indication that the data request for the application 110 should be fulfilled with actual data, the capabilities manager 120 may return the actual data to the application 110, for example, by retrieving the data using the appropriate API. For example, the application capabilities 160 does not include a stub phone number, indicating that application 110 is allowed to access the actual phone number of the computing device 100.

FIGS. 4*a*, 4*b* and 4*c* show an example of a capabilities manager displayed on a computing device according to an implementation of the disclosed subject matter. The capabilities manager 120 may be able to manage the capabilities granted to applications installed on the computing device 100. For example, the capabilities for the application 110 may be edited to allow the application 110 access to actual data when the application 110 was given access to stub data during installation. The application selection display 410 may display a list of applications installed on the computing device 100. The user may select one of the installed applications to manage the capabilities of that application, for example, by selecting application element 411 to select Application A, application element 412 to select Application B, or selecting application element 413 to select Application C.

After an application is selected from the application selection display 410, the capabilities manager 120 may present the capabilities selection display 420. The capabilities selection display 420 may include all of the capability requests made by the selected application when the application was installed. For example, the user may have selected Application B using application element 412, resulting in the display of the capability requests made by Application B. The capabilities selection display 420 may display a selection element for each request, for example, for Application B, phone number request 421, contacts request 422, current location request 423, and location history request 424 may be displayed. The user may select one of the capability requests from the capabilities selection display 420.

The selected capability request may be displayed on the capability request display 430. The displayed information about the selected capability request may be based on the capabilities database 150. For example, for the Application B, the application capabilities in the capabilities database 150 may indicate that the Application B should receive a stub location of Baltimore, Md., in response to requests for the current location of the computing device 100. The user may edit the capability request using the capability request display 430. For example, the user may edit the selected current location request 423 using actual location box 431, stub location box 432, and stub location data 433. The user may select the actual location box 431 to allow the application access to the actual location of the computing device 100, and the user may select the stub location box 432 to provide the stub location in the stub location data 433 in response to the application's request for the current location of the computing device 100. The user may edit the stub location data 433 to change the stub location provided to the application. Changes to capability requests made by the user may be stored in the appropriate entry for application capabilities in the capabilities database 150. For example, any changes made to the capability requests for the application 110 using the capabilities manager 120 may be stored in the capabilities database 150 in the application capabilities 160.

Figure 5:
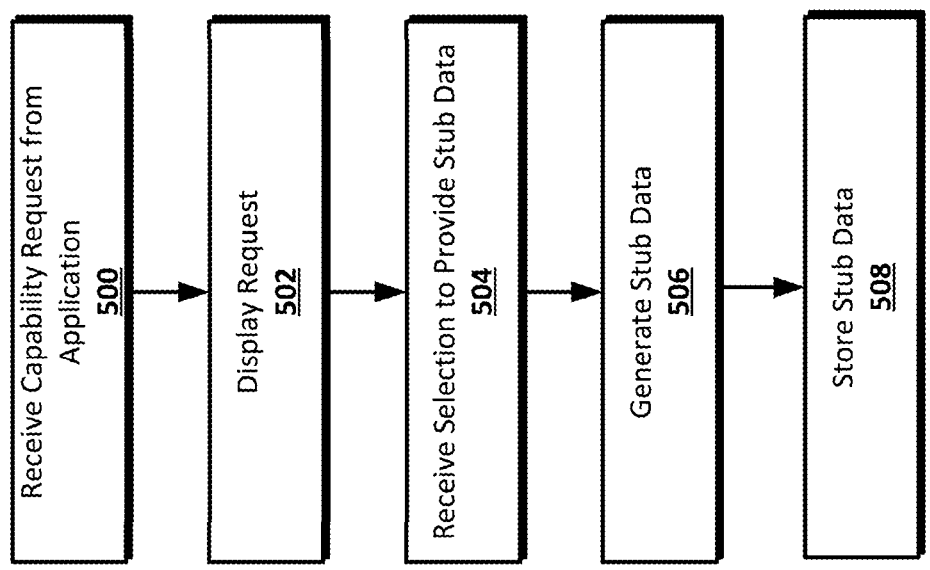
FIG. 5 shows an example of a process for handling a request for capabilities from an application with a capabilities manager according to an implementation of the disclosed subject matter.

FIG. 5 shows an example of a process for handling a request for capabilities from an application with a capabilities manager according to an implementation of the disclosed subject matter. At 500, a capability request may be received from an application. For example, the capabilities manager 120 may receive the capability request from the application 110 while the application 110 is being installed on the computing device 100. The application 110 may request the capability to access data on the computing device 100 or associated with the account of the user logged in on the computing device 100, such as, for example, the phone number of the computing device 100, contacts, the current location of the computing device 100, and the location history of the computing device 100.

At 510, the capability request may be displayed. For example, the capabilities manager 120 may display the capability request received from the application 110 on a display of the computing device 100. The display may allow the user to view the capability request and make a selection as to whether to allow the capability request, granting the application 110 the capability to access the requested data, or to stub out the request, which may result in the application 110 being provided with stub data.

At 520, a selection to provide stub data may be received. For example, the capabilities manager 120 may receive a selection from the user to stub out the capability request from the application 110. The user may not wish to grant the application 110 the capability to access the actual requested data, but may still want to install the application 110. By selecting to provide stub data to the application 110, the user may continue to install the application 110 without providing the application 110 access to data the user wishes to keep private. The application 110 may be unaware that the capability request was stubbed out, and may install and function as if the capability request was allowed.

At 530, stub data may be generated. For example, the user may have chosen to stub out a capability request from the application 110 for access to the current location of the computing device 100. The application 110 may be unaware that the capability request was stubbed out, and when running may still request the current location of the computing device 100. In order for the application 110 to function properly, requests by the application 110 for the current location of the computing device 100 may need to be responded to with location data that the application 110 will recognize as valid. A stub location, for example, the stub location 161, may be generated. For example, the capabilities manager 120 may generate the stub location 161, or the stub location 161 may be entered by the user. The stub location 161 may be a location that will be provided in response to a request by the application 110 for the current location of the computing device 100 in lieu of allowing the application 110 access to the actual location of the computing device 100. The application 110 may recognize the stub location 161 as valid location data, and continue to operate as if the application 110 was provided with the actual current location of the computing device 100.

The stub data may be randomized or otherwise generated in a manner that may prevent an application, such as the application 110, from determining that the application is receiving stub data instead of actual data. For example, the stub location 161 may be changed automatically at specified intervals to give the impression that the computing device 100 is moving, and is not constantly in one location, as lack of movement may be used by an application to determine that it is receiving a stub location. Stub contacts, for example, the stub contacts 163, may be randomly generated contacts instead of an empty contact list, to prevent the application from determining that it does not have access to the actual contacts list. Other stub data types may also be suitably randomized.

At 540, the stub data may be stored. For example, the stub location 161 may be stored in the capabilities database 150, in the application capabilities 160 for the application 110. The presence of the stub location 161 in the application capabilities 160 may server as an indication to that the capability request associated with the stub location 161 was stubbed out. Indications of capability requests that were not stubbed out for the application 110 may also be stored in the capabilities database 150, or may be inferred from the absence of stub data for the capability requests. Stub data stored in the capabilities database 150 may be accessed by the capabilities manager 120.

Figure 6:
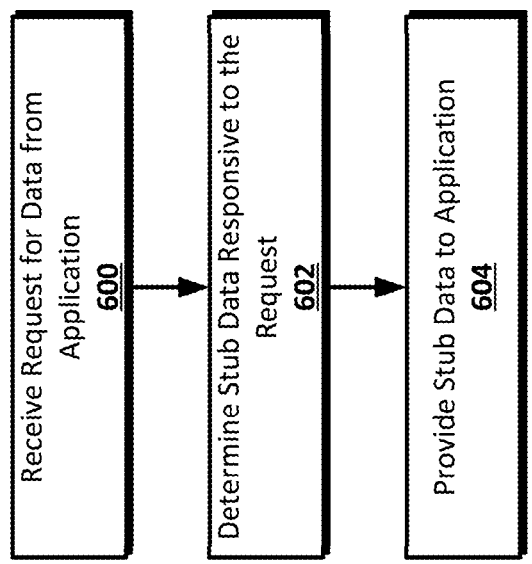
FIG. 6 shows an example of a process for handling a request for data from an application with a capabilities manager according to an implementation of the disclosed subject matter.

FIG. 6 shows an example of a process for handling a request for data from an application with a capabilities manager according to an implementation of the disclosed subject matter. At 600, a request for data may be received. For example, the capabilities manager 120 may receive a request for the current location of the computing device 100 from the application 110 running on the computing device 100. The request may be sent directly to the capabilities manager 120, intercepted by the capabilities manager 120, or sent to an appropriate API that includes functionality of the capabilities manager 120. The request may be for data that was associated with a capability request, and which the user may have chosen to allow access to or to stub out.

At 610, responsive stub data may be determined. For example, the capabilities manager 120 may check the capabilities database 150 to determine if the application 110 is allowed access to the requested data, for example, the current location of the computing device 100, or if the capability request for access to the data was stubbed out and the application 110 should be provided with stub data, for example, the stub location 161. The capabilities manager 120 may determine that the capability request from the application 110 was stubbed out based on the presence of the stub location 161 in the application capabilities 160 for the application 110 in the capabilities database 150.

At 620, the stub data may be provided to the requesting application. For example, the stub location 161 may be provided by the capabilities manager 120 to the application 110 in response to the request for the current location of the computing device 100 by the application 110. The application 110 may be unaware the stub location 161 is not the actual location of the computing device 110, and may continue to function as if it had received the actual location, as the stub location 161 will appear to be the actual location to the application 110. The application 110 may thus continue to function properly, having its data requests fulfilled, while the user may prevent the application 110 from accessing data, such as the current location of the computing device 100, that the user wishes to keep private. If there is no responsive stub data in the capabilities database 150, for example, because the capability request for access to the data was allowed, then the capabilities manager 120 may return, or allow the application 110 access to, the actual data to fulfill the request.

Figure 7:
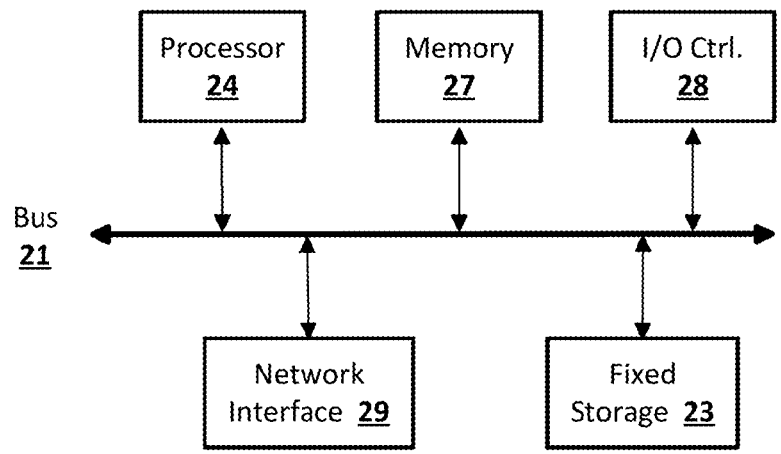
FIG. 7 shows a computer according to an embodiment of the disclosed subject matter.

Embodiments of the presently disclosed subject matter may be implemented in and used with a variety of component and network architectures. FIG. 7 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 8.

Many other devices or components (not shown) may be connected in a similar manner, such as document scanners, digital cameras, auxiliary, supplemental, or backup systems, or the like. Conversely, all of the components shown in FIG. 7 need not be present to practice the present disclosure. The components can be interconnected in different ways from that shown. The operation of a computer such as that shown in FIG. 7 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 8:
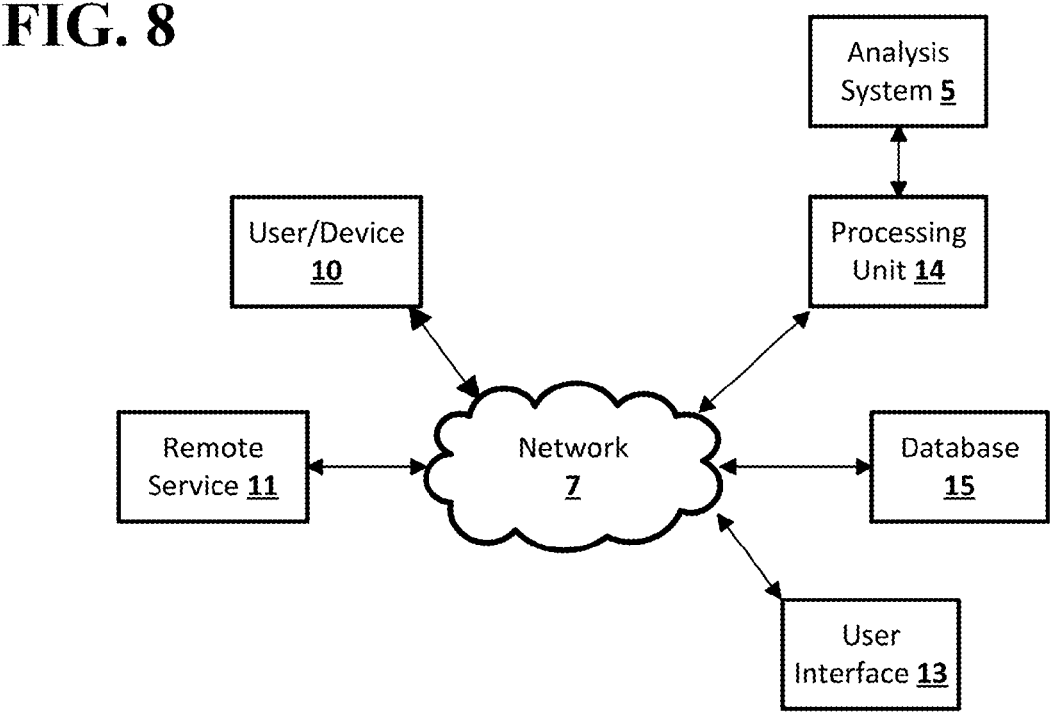
FIG. 8 shows a network configuration according to an embodiment of the disclosed subject matter.

FIG. 8 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed by a data processing apparatus, the method comprising:

receiving a capability request from an application, wherein the capability request is a request for access to data associated with a capability, wherein the data associated with the capability comprises data associated with a computing device or data associated with a user account logged-in to the computing device;

receiving a selection to provide the application with stub data upon receiving a request from the application to access the data associated with the capability, wherein receiving the request for the data associated with the capability comprises intercepting the request for the data associated with the capability intended for an Application Programming Interface associated with the capability or receiving the request for the data associated with the capability at an Application Programming Interface associated with the capability, wherein the stub data comprises data that is responsive to the request for the data associated with the capability and is not actual user data, wherein the actual user data comprises data that is accurately responsive to the request for the data associated with the capability;

generating the stub data to be provided to the application instead of the actual user data when the application requests the data associated with the capability, wherein the provision of the stub data prevents the application from accessing the actual user data when the application requests access to the data associated with the capability;

storing the stub data;

generating random stub data after a specified interval of time; and automatically changing the stub data to the random stub data after the specified interval of time.

2. The computer-implemented method of claim 1, further comprising:

receiving the request from the application for the data associated with the capability;

determining that the application is to be provided with the stub data when the application requests access to the data associated with the capability;

retrieving the stub data; and providing the stub data to the application.

3. The computer-implemented method of claim 2, wherein the application is unaware that the stub data is not the actual user data.

4. The computer-implemented method of claim 2, further comprising:

receiving a selection to stop providing the application with the stub data when the application requests access to the data associated with the capability;

removing the stub data; and upon receiving the request for the data associated with the capability from the application, providing actual user data associated with the capability to the application instead of the stub data.

5. The computer-implemented method of claim 1, wherein the data associated with the capability comprises one of: a phone number of a computing device, a contacts lists, a current location of the computing device, a location history of the computing device, sound data from a microphone of the computing device, image data from the camera of the computing device, accelerometer data from an accelerometer of the computing device, and sensor data from a sensor of the computing device.

6. The computer-implemented method of claim 1, wherein receiving the selection comprises one of:

using a default selection; and receiving the selection from a user.

7. The computer-implemented method of claim 1, wherein storing the stub data further comprises storing the stub data in an entry for application capabilities for the application.

8. The computer-implemented method of claim 1, wherein generating the stub data comprises one of:

randomly generating the stub data; and receiving the stub data as input from a user.

9. The computer-implemented method of claim 1, further comprising:

receiving a selection to change the stub data for the application;

receiving changed stub data; and storing the changed stub data in place of the stub data.

10. The computer-implemented method of claim 1, wherein the random stub data is generated based on the stub data.

11. A computer-implemented method performed by a data processing apparatus, the method comprising:

receiving a plurality of capability requests from an application during installation of the application, each capability request associated with a capability to access data, wherein the data associated with the capability to access data comprises data associated with a computing device or data associated with a user account logged-in to the computing device;

displaying the plurality of capability requests;

receiving in response to each of the plurality of capability requests a selection to provide the application with actual user data or to provide the application with stub data when the application requests data associated with the capability to access data, wherein receiving the request for the data associated with the capability to access data comprises intercepting the request for the data associated with the capability to access data intended for an Application Programming Interface associated with the capability or receiving the request for the data associated with the capability to access data at an Application Programming Interface associated with the capability, wherein the stub data comprises data that is responsive to the request for the data associated with the capability to access data and is not the actual user data, wherein the actual user data comprises data that is accurately responsive to the request for the data associated with the capability to access data;

generating the stub data for each capability request for which a selection was received in response to the capability request to provide the application with the stub data instead of the actual user data, preventing the application from accessing the actual user data when the application requests access to the data associated with the capability;

storing the stub data in a capabilities database for each capability request for which a selection was received in response to the capability request to provide the application with the stub data, wherein the provision of the stub data prevents the application from accessing the actual user data when the application requests access to the data associated with the capability;

generating random stub data after a specified interval of time; and automatically changing, after the specified interval of time, the stub data in the capabilities database for at least one of the capability requests for which a selection was received in response to the capability request to provide the application with the stub data to the random stub data.

12. The computer-implemented method of claim 11, further comprising storing an indication of each capability request for which a selection was received to provide the application with the actual user data in the capabilities database.

13. The computer-implemented method of claim 11, further comprising:

receiving the request for data from the application, wherein the request for data is associated with a capability to access data;

determining using the capabilities database that the application is to be provided with the stub data when the application requests access to the data associated with the capability to access data; and returning the stub data to the application in response to the request for data.

14. The computer-implemented method of claim 11, wherein each of the plurality of capability requests comprises a request for access to one of: a phone number of a computing device, a contacts lists, a current location of the computing device, a location history of the computing device, sound data from a microphone of the computing device, image data from the camera of the computing device, accelerometer data from an accelerometer of the computing device, and sensor data from a sensor of the computing device.

15. The computer-implemented method of claim 11, wherein the random stub data is generated based on the stub data.

16. A computer-implemented method performed by a data processing apparatus, the method comprising:
    receiving a request for data from an application running on the data processing apparatus by intercepting the request for the data intended for an Application Programming Interface associated or receiving the request for the data at an Application Programming Interface, wherein the requested data is actual user data associated with a capability and is associated with the data processing apparatus or with a user account logged-in to data processing apparatus;
    determining that the application is not allowed to access the requested actual user data associated with the capability;
    preventing the application from accessing the requested actual user data associated with the capability;
    providing the application with stub data retrieved from a storage of the data processing apparatus instead of the actual user data, wherein the stub data comprises data that is responsive to the request for the data associated with the capability and is not the actual user data, wherein the actual user data comprises data that is accurately responsive to the request for the data associated with the capability;
    generating random stub data after a specified interval of time; and
    automatically changing the stub data to the random stub data after the specified interval of time.

17. The computer-implemented method of claim 16, wherein determining that the application has not been allowed the associated capability comprises checking an indication in a capabilities database.

18. The computer-implemented method of claim 17, wherein the indication is the presence of stub data associated with the capability.

19. The computer-implemented method of claim 16, wherein the stub data appears to the application to be the requested data, and wherein the stub data is different from the requested data.

20. The computer-implemented method of claim 16, wherein the random stub data is based on the stub data.

21. A computer-implemented system for protecting user privacy from applications comprising:
    a storage device comprising a capabilities database, the capabilities database comprising application capabilities, the application capabilities comprising stub data, wherein the stub data for each of the application capabilities comprises data that is responsive to a request for data associated with the application capability and is not actual user data, wherein the actual user data comprises data that is accurately responsive to the request for the data associated with the application capability, wherein each of the application capabilities is associated with an application;
    a capabilities manager adapted to receive a capability request from an application wherein the capability request is a request for access to data associated with a capability, wherein the data associated with the capability comprises data associated with a computing device or data associated with a user account logged-in to the computing device, generate stub data, store the stub data in the application capabilities associated with the application in the capabilities database, generate random stub data after a specified interval of time, automatically change the stub data to the random stub data after the specified interval of time, receive the request for data from an application by intercepting the request for the data intended for an Application Programming Interface associated or receiving the request for the data at an Application Programming Interface, and provide the application the random stub data instead of the actual user data responsive to the request for data from the application capabilities associated with the application in the capabilities database and prevent the application from accessing the actual user data.

22. The computer-implemented system of claim 21, wherein the capabilities manager is further adapted to edit the application capabilities in the capabilities database.

23. The computer-implemented system of claim 21, wherein the capabilities manager is further adapted to display the capability request received from an application and receive a selection indicating that when the application requests access to the data associated with the capability, the application will be provided with the stub data.

24. The computer-implemented system of claim 21, wherein the computing device is one item from a group consisting of: a tablet, a smartphone, and a laptop.

25. The computer-implemented system of claim 21, wherein the data comprises one of: a phone number of the computing device, a contacts lists, a current location of the computing device, a location history of the computing device, sound data from a microphone of the computing device, image data from the camera of the computing device, accelerometer data from an accelerometer of the computing device, and sensor data from a sensor of the computing device.

26. The computer-implemented system of claim 21, wherein the random stub data is based on the stub data.

27. A system comprising: one or more computers and one or more storage devices storing instructions which are operable, when executed by the one or more computers, to cause the one or more computers to perform operations comprising:
    receiving a capability request from an application, wherein the capability request is a request for access to data associated with a capability wherein the data associated with the capability comprises data associated with a computing device or data associated with a user account logged-in to the computing device;
    receiving a selection to provide the application with stub data upon receiving a request from the application to access the data associated with the capability, wherein receiving the request for the data associated with the capability comprises intercepting the request for the data associated with the capability intended for an Application Programming Interface associated with the capability or receiving the request for the data associated with the capability at an Application Programming Interface associated with the capability, wherein the stub data comprises data that is responsive to the request for the data associated with the capability and is not actual user data, wherein the actual user data comprises data that is accurately responsive to the request for the data associated with the capability;

generating the stub data to be provided to the application instead of the actual user data when the application requests the data associated with the capability, wherein the provision of the stub data prevents the application from accessing the actual user data when the application requests access to the data associated with the capability;

storing the stub data in a capabilities database;

generating random stub data after a specified interval of time; and automatically changing the stub data to the random stub data after the specified interval of time.

28. The system of claim 27 wherein the instructions further cause the one or more computers to perform operations further comprising:

receiving a request from the application for the data associated with the capability;

determining that the application is to be provided with the stub data when the application requests access to the data associated with the capability;

retrieving the stub data from the capabilities database; and providing the stub data to the application.

29. The system of claim 27, wherein the random stub data is generated based on the stub data.

* * * * *